Feb. 20, 1968  A. HIMY  3,369,937
MULTIPLE PLATE BATTERY CONSTRUCTION
Filed March 10, 1966  2 Sheets-Sheet 1
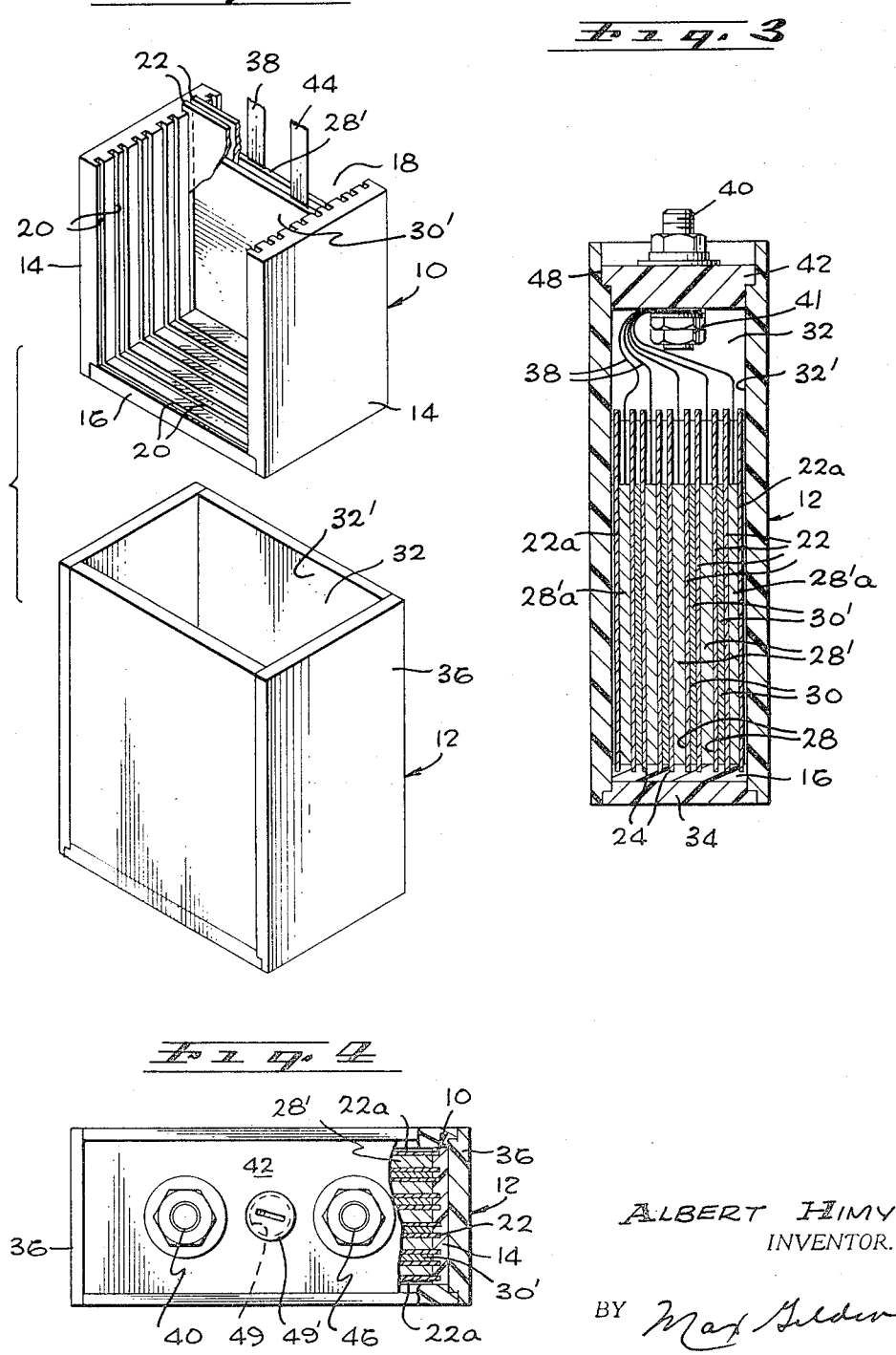
ALBERT HIMY
INVENTOR.
BY *Max Gelden*
ATTORNEY Feb. 20, 1968    A. HIMY    3,369,937
MULTIPLE PLATE BATTERY CONSTRUCTION
Filed March 10, 1966    2 Sheets-Sheet 2
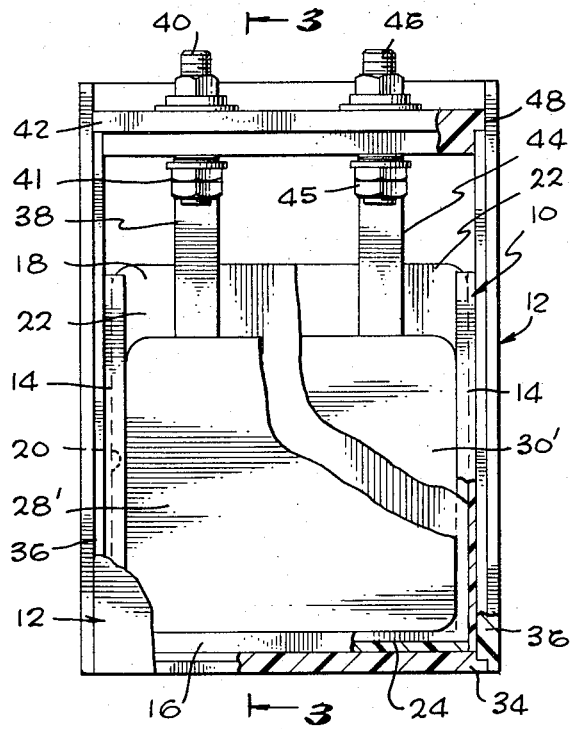
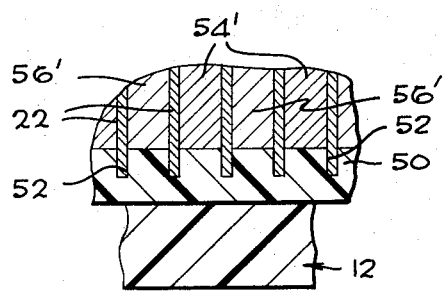
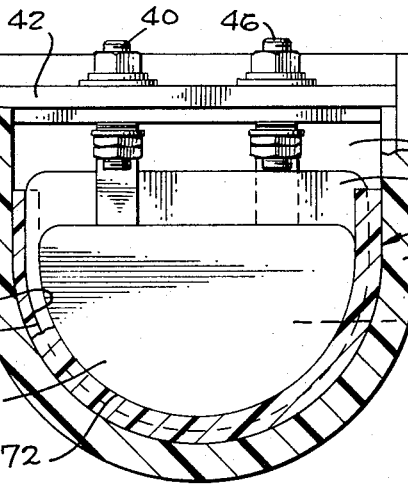
ALBERT HIMY
INVENTOR.
BY *Max Gelder*
ATTORNEY United States Patent Office 3,369,937
Patented Feb. 20, 1968

3,369,937
MULTIPLE PLATE BATTERY CONSTRUCTION
Albert Himy, Tustin, Calif., assignor, by mesne assignments, to McDonnell Douglas Corporation, Santa Monica, Calif., a corporation of Maryland
Filed Mar. 10, 1966, Ser. No. 533,170
9 Claims. (Cl. 136—80)

This invention relates to a novel battery construction, and is particularly concerned with the provision of a simple multiplate battery construction or unit particularly designed for use with rigid inorganic separators.

Batteries are an important source of energy storage for power generation. In addition to the common lead-acid storage battery, an important type of battery particularly suited for air-borne applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead-acid storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units, and the like. In such batteries, it is conventional to employ a separator in the form of a porous member between the electrodes, to permit free passage of electrolyte ions.

In most practical applications in order to obtain a higher power output, multiple plate batteries or cells, e.g., of the types noted above, are employed. In the art of multiple plate cells one type of separator often employed between adjacent positive and negative electrodes is a semi-permeable or permeable sheet material, for example, regenerated cellulose, which is wrapped around the electrodes. Other types of separators, generally of an organic nature, have also been utilized. Various modes of assembly of such separators in relation to the electrodes are shown in the prior art, but these modes of assembly often are relatively complex, and increase the battery cost.

It has been found that various porous inorganic separator materials such as hydrous metal oxides and aluminosilicates provide superior separator materials having improved properties over the organic separators, such as the regenerated cellulose separators of the prior art. Such improved inorganic separators are described and claimed in the copending applications Ser. No. 379,093 filed June 30, 1964 by Carl Berger et al.; Ser. No. 378,858 filed June 29, 1964 by Carl Berger et al., now abandoned; and Ser. No. 499,294 filed Oct. 21, 1965 by Carl Berger et al. However, such inorganic separators are in the form of rigid membranes or plates and thus such rigid porous inorganic separators cannot be assembled as in the case of the above noted flexible organic semi-permeable separators of the prior art, e.g., by wrapping around the electrode plates of a multiplate cell or battery. Further, the use of such substantially rigid inorganic, e.g., ceramic, separators, particularly for design of a silver-zinc battery, presents the problem of insulating all portions of the silver and zinc electrodes electrically. Thus, electrode compartments must be provided for each electrode, which are sealed sufficiently to prevent "short circuiting" of electrodes through metal, e.g., silver or zinc, dendrites or "treeing," with fluid access from one electrode compartment to an adjacent electrode compartment provided only through the micropores of the inorganic, e.g., ceramic, separators, which separate such compartments. Moreover, when employing such rigid inorganic separators, it has been sought to avoid relatively complex modes of assembly of such improved inorganic separators, commonly encountered with respect to other types of organic separators employed in the prior art.

The instant invention provides a simple inexpensive and readily assembled battery construction or unit employing substantially rigid separators, particularly inorganic, and in which such separators are properly supported in relation to a series of negative and positive electrodes in a multiplate cell or battery, so that each separator is disposed between a pair of positive and negative electrodes of the battery, and forming substantially sealed electrode compartments for said electrodes, while permitting transport of electrolyte ions through the separator from one electrode to an adjacent electrode of opposite polarity.

Thus, a multiplate battery construction or unit is provided according to the invention, comprising a frame open at one end, which can be, for example, a three-sided substantially rectangular frame open at one side, a plurality of spaced substantially parallel grooves formed in the interior wall of said frame, a plurality of substantially rigid porous separators positioned in spaced substantially parallel relation with their peripheral portions received in said grooves, and a plurality of positive electrodes and a plurality of negative electrodes positioned in alternate relation to each other, with adjacent positive and negative electrodes separated by one of said separators, said electrodes being retained in position between adjacent separators.

The grooves in the wall of the frame are so spaced from each other as to provide for the positioning of an electrode between adjacent separators so that when the separators are positioned in the grooves within the frame and the electrodes placed between the adjacent separators, a snug assembly is afforded with the separators positively retained in the grooves and the electrodes each being held in position substantially in contact with an adjacent pair of separators. The grooves in the frame wall may or may not be equally spaced, depending upon the thickness of the respective positive and negative electrodes.

In preferred practice and to provide sealed electrode compartments to receive and maintain the electrodes in position between the substantially rigid separators, and to prevent leakage of electrolyte around the peripheral edges of the separators from one electrode compartment to an adjacent electrode compartment, the separators are sealed in the grooves by means of a sealing material or a cement placed in the grooves around the peripheral edge of the separators.

Such unit comprising the frame carrying the arrangement of separators and electrodes noted above, is then inserted into a battery case having a size which is sufficient to receive and retain such unit snugly within the walls of the battery. Suitable electrical connections are then made between the respective positive and negative electrodes and the terminals mounted on the battery, and the battery case, containing a suitable electrolyte such as potassium hydroxide, is then sealed.

The grooved frame which supports the system of separators and positive and negative electrodes according to the invention, can be of any desired shape as rectangular, square, circular or elliptical, provided one end of the frame is open sufficiently to permit introduction of the separators into the respective grooves, and introduction of the respective positive and negative electrodes into the respective electrode compartments formed by the separators. The separators and electrodes will have a shape, e.g., rectangular, square and the like, corresponding to the shape of the frame which receives these components.

Thus, for example, a three-sided rectangular frame open at one side can be provided with grooves on the interior wall and rectangular inorganic separators inserted in such slots and cemeted in place. Electrodes, e.g., silver and zinc electrodes, also of substantially rectangular shape, are then inserted in respective alternate electrode compartments formed between adjacent separators, electrical connections from the respective electrodes are attached and the multiplate high energy density battery, such as a part of the battery cover, and the entire unit or pack then inserted into a conventional, e.g., smooth wall case, and the cover attached in place.

As previously noted, the present invention can be embodied in any form of multiplate cell or battery, including the above noted conventional lead-acid multiplate cell, and the multiplate high energy density battery, such as multiplate zinc-silver, silver-cadminum or nickel-cadmium cell.

The invention will be more clearly understood by reference to the description below of certain preferred embodiments, taken in connection with the accompanying drawing wherein:

FIG. 1 is a perspective illustration of a grooved frame adapted to receive and retain substantially rigid separators and electrodes as a unit, for insertion into a battery case, according to the invention;

FIG. 2 shows a side elevation partially broken away of the assembly of the frame carrying the separators and electrodes, in a battery case;

FIG. 3 is a vertical section taken on line 3—3 of FIG. 2;

FIG. 4 is a plan view of the battery construction of FIG. 2, with a portion of the cover broken away;

FIG. 5 illustrates a modification of the unit shown in FIGS. 1 to 4; and

FIG. 6 is an illustration of another modification of the invention.

Referring to FIGS. 1 to 4 of the drawings, numeral 10 represents a grooved frame for mounting the separators and electrodes according to the invention, and which is received and assembled in a battery case 12, as described in detail below. The frame 10 is of substantially rectangular or square shape, having two opposite sides 14 suitably connected by a bottom member or side 16, the upper end 18 of the frame being open.

The interior wall of the three-sided frame 10 is provided with a plurality of parallel grooves 20, each of such grooves being continuous, that is, each of the respective grooves are continuous from one side wall 14 and along the bottom side 16 and then along the opposite side 14. The electrode-separator frame 10 can be constructed of any suitable material, e.g., an organic plastic material such as Lucite (an acrylate resin).

The above noted grooves 20 are sufficiently wide to receive a porous substantially rigid, e.g., ceramic separator 22 by inserting the peripheral edge 24 along three sides of the separator into the respective slots 20. As seen in FIG. 2, the separators 20 are of substantially rectangular shape. Preferably, although not necessarily, a sealing material such as Silastic (a silicone rubber), or an adhesive such as an epoxy adhesive, is placed around the peripheral edge 24 of the separators 22 and in the grooves 20, to seal the spaces between adjacent separators to provide sealed electrode compartments as described more fully below.

Referring to FIGS. 1 and 3, it will be seen that the grooves 20 and the separators 22 retained in such grooves are spaced so that alternate spaces 28 formed by such separators are equally spaced, and alternate spaces 30 between such separators are equally spaced, but with the spaces 28 being greater in width than the spaces 30, for reasons pointed out hereinafter. The alternate spaces 28 form electrode compartments in which are inserted zinc electrodes 28', and the intermediate alternate spaces 30 form electrode compartments in which are inserted silver electrodes 30'. Electrodes 28' and 30' are substantially rectangular, and have approximately the same width and height, the bottom edge of said electrodes resting on the inner wall 31 of the frame 10. In silver-zinc batteries, however, the thickness of the zinc electrodes is generally greater than that of the silver electrodes, hence the need for zinc electrode compartments 28 having a greater width than that of the silver electrode compartments 30. It will be seen that the substantially rectangular separators 22 have a width and a height greater than the corresponding width and height of the electrodes 28' and 30'.

The inorganic separator material which can be used to form the substantially rigid preferred inorganic separator plates or discs 22 can include a variety of inorganic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such hydrous metal oxide separator materials and their method of preparation are described in the copending application Serial No. 379,093 filed June 30, 1964 of Carl Berger et al. A preferred separator of this type is hydrous zirconium oxide or zirconia.

Other porous inorganic materials which can be employed for producing the substantially rigid separator include the aluminosilicates, particularly the alkali metal and alkaline earth metal aluminosilicates, due to their formation of a hard ceramic material upon sintering, while still retaining suitable porous characteristics. The aluminosilicate separators, preferably in sintered form, have relatively low internal resistance. Examples of such aluminosilicates include aluminosilicate, sodium and potassium aluminosilicates, and magnesium, calcium, barium and strontium aluminosilicates. These materials can be used separately, but often mixtures of these aluminosilicates are used, e.g., complex mixtures of both the alkali metal and alkaline earth metal aluminosilicates. Such inorganic separator materials are described in the above mentioned copending U.S. applications Ser. No. 378,858, and Ser. No. 499,294 of Carl Berger et al.

The thickness of the inorganic separators or membranes 22 can vary, and can range, for example, from about 0.010 inch to about 0.030 inch, although this range is only understood to be exemplary. The thickness of the zinc and silver electrodes 28' and 30' also can of course vary and can range from about 0.010 to about 0.150 inch.

The unit including the frame 10 carrying the separators 22 and the zinc and silver electrodes 28' and 30' assembled therein, is then inserted through the open upper end 32 of the battery case 12, as indicated in FIG. 1, into such case. The battery case can be constructed of any suitable material but is generally formed of a suitable organic polymeric material such as Lucite, similarly to the frame 10. The size of the rectangular interior 32' of the case 12 is such as to receive the frame 10 with its separator and electrode components, in snug position when this unit is inserted into the battery case 12 and rests on the bottom 34 of the case. Thus, viewing FIGS. 2 and 3, it will be seen that, for example, the sides 14 of the frame 10 are in close contact with the adjacent walls 36 of the battery case.

Conductive electrode tabs or ribbons 38 which are connected to the upper ends of each of the zinc electrodes 28, are attached to terminal 40 by means of lock nuts 41, such terminal 40 being mounted on the battery cover 42. Likewise, conductive tabs 44 which are connected to the upper ends of the silver electrodes 30' are connected by means of lock nuts 45 to a second terminal 46 also mounted on the battery cover 42. The cover 42, which has a central aperture 49 for introduction of electrolyte, if desired, sealed by a plug 49', is then attached in place over the upper opening 32 of the battery case, as by cementing at 48. It will be understood that if desired, the frame 10 and the separators 22 and electrodes 28' and 30' mounted thereon first can be assembled with the tabs 38 and 44 attached to the terminals 40 and 46, and with the cover 42, and this entire unit inserted into the battery case 12, and the cover thereafter cemented in place. Alternately, the frame 10 carrying the separators and electrodes can first be inserted into the battery case, and the connections then made between the tabs 38 and 44 and the terminals 40 and 46, followed by positioning of the cover in place on the top of the battery.

Viewing particularly FIG. 3, it is seen that by cementing the peripheral edges of the separators 22 which are received in the grooves 20, in place in such grooves, sealed electrode compartments 28 and 30 for receiving the zinc and silver electrodes 28' and 30' are provided, thereby insuring against leakage of electrolyte around the periphery of the separators from one electrode compartment 28 to an adjacent electrode compartment 30.

Referring particularly to FIG. 3, it will be noted that the two outermost separators 22a function primarily as supports to retain the two outermost zinc electrodes 28' in position in the frame 10. Hence, if desired, such two outermost separators 22a each can be replaced by another type of supporting member either porous or non-porous, such as a sheet of plastic, and such sheets retained in the two outermost grooves 20 as in the case of the two outermost separators 22a.

In the embodiment shown in FIGS. 1 to 4, there is illustrated a multiplate cell according to the invention containing five negative electrodes or zinc plates 28' and four positive or silver electrodes 30'. However, it will be understood that the number of slots and separators employed, and the number of electrode compartments and plates thereby provided can be varied as desired.

A silver-zinc battery of the type illustrated in FIGS. 1 to 4 when tested operated satisfactorily for 1165 cycles of one-half hour discharge, one-half hour charge per cycle, at 10% depth of discharge. A similar cell when tested operated satisfactorily for 427 such cycles at 30% depth of discharge.

Referring to FIG. 5, there is shown a modified form of the invention device, comprising a frame 50 similar to frame 10 of FIGS. 1 to 4, and having grooves 52 formed in the sides of such frames similar to the slots 20, but wherein the slots 52 are all substantially equally spaced. In this embodiment, the electrodes 54' in alternate spaces formed between the separators 22 are of the same thickness as the electrodes 56' of opposite polarity received in the adjacent alternate spaces between the separators 22. Thus, in this embodiment, the electrodes 54' can be nickel electrodes and the electrodes 56' cadmium electrodes for provision of a nickel-cadmium battery, according to the invention principles.

Referring now to FIG. 6, there is shown a battery having an internal cross section which is essentially circular. Accordingly, in this embodiment, the frame 60 corresponding to frame 10 of FIG. 1, and which is received within the battery case 62, is of corresponding circular shape and having arcuate grooves 63 formed therein. The upper end 65 of frame 60 is open, and the grooves 63 of the frame receive the arcuately shaped edge 64 of the respective separators 66, and between such separators are disposed in alternating manner electrodes 68 and 70 of opposite polarity, each having an arcuate edge 72 disposed along the curved interior wall of the frame 60.

Although in preferred practice, as previously noted, the peripheral edge of the separators, e.g., 22 in FIGS. 1 to 4, or 66 in FIG. 6, are cemented in place in the grooves 20 or 63, in order to provide sealed electrode compartments, in some cases such sealing or cementing of the peripheral edges of the separators is not required. Thus, for example, in the case of the provision of a nickel-cadmium or a silver-cadmium battery employing the invention construction, but without cementing the separators in place, even though some electrolyte leakage may take place around the periphery of the separators, e.g., from a nickel electrode compartment to a cadmium electrode compartment, in such case the leakage does not cause serious deterioration of the electrodes, as would be the case for a silver-zinc battery, where such electrolyte leakage could cause undesirable formation of zinc dendrites or "treeing," and result in rapid deterioration of the battery.

From the foregoing, it is seen that the invention provides a simple compact and inexpensive multiplate battery construction or unit in which substantially rigid, e.g., inorganic separator plates, are positively mounted in position on the interior wall of a frame, and the respective electrodes of opposite polarity held firmly in position between respective separators, and the entire unit inserted into a battery and the electrodes properly electrically connected to the battery terminals to provide an operative battery. The invention construction possesses the advantages of ease of assembly, good quality control, use of conventional battery cases, and versatility.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A multiplate battery construction comprising a case, a frame received in said case, said frame consisting of a bottom and two side portions and being open at one end, a plurality of spaced substantially parallel grooves formed in the interior wall of said bottom and side portions of said frame, a plurality of substantially rigid porous separators positioned in spaced substantially parallel relation with their peripheral portions received in said grooves, and a plurality of positive electrodes and a plurality of negative electrodes positioned in alternate relation of each other, with adjacent positive and negative electrodes separated by one of said separators, said electrodes being retained in position between adjacent separators.

2. A multiplate battery construction as defined in claim 1, said frame being a rectangular three-sided frame open at its upper end, the intermediate side forming the bottom of said frame, said grooves being formed in the interior wall of the three sides of said frame.

3. A multiplate battery construction as defined in claim 1, said separators being sealed in said grooves, and providing sealed electrode compartments between said separators, with said electrodes positioned in said compartments.

4. A multiplate battery construction as defined in claim 1, including a plurality of first conductive electrode tabs connected to said positive electrodes, a plurality of second conductive electrode tabs connected to said negative electrodes, a cover mounted on said case, a first terminal mounted on said cover and a second terminal mounted on said cover, said first tabs being connected to said first terminal and said second tabs being connected to said second terminal.

5. A multiplate battery construction as defined in claim 2, said separators and electrodes being substantially rectangular, the width of said separators between the two opposite sides of said frame being greater than the corresponding width of said electrodes, and the height of said separators from the third side of said frame being greater than the corresponding height of said electrodes.

6. A multiplate battery construction as defined in claim 1, wherein said separators are rigid inorganic separators.

7. A multiplate battery as defined in claim 1, said positive electrodes being zinc electrodes and said negative electrodes being silver electrodes.

8. A multiplate battery construction as defined in claim 2, wherein said separators are rigid inorganic separators, said separators and electrodes being substantially rectangular, the width of said separators between the two opposite sides of said frame being greater than the corresponding width of said electrodes, and the height of said separators from the third side of said frame being greater than the corresponding height of said electrodes.

9. A multiplate battery as defined in claim 2, wherein said separators are rigid inorganic separators, said positive electrodes being zinc electrodes and said negative electrodes being silver electrodes, said separators and electrodes being substantially rectangular, the width of said separators between the two opposite sides of said frame being greater than the corresponding width of said electrodes, and the height of said separators from the third side of said frame being greater than the corresponding height of said electrodes, said separators being sealed in said grooves, and providing sealed electrode compartments between said separators, with said electrodes positioned in said compartments.

References Cited

UNITED STATES PATENTS

| | | | |
|---|---|---|---|
| 402,484 | 4/1889 | Schoop | 136—166 |
| 418,700 | 1/1890 | Dey | 136—143 |
| 1,371,998 | 3/1921 | Gill | 136—143 |
| 1,564,173 | 12/1925 | Ford et al. | 136—166 |
| 1,778,613 | 10/1930 | Von Grimmenstein | 136—81 |
| 1,874,404 | 8/1932 | Wood | 136—80 |
| 3,118,100 | 1/1964 | Chreitzberg | 136—30 |

ALLEN B. CURTIS, *Primary Examiner.*

WINSTON A. DOUGLAS, *Examiner.*

A. SKAPARS, *Assistant Examiner.*